US006817231B2

(12) United States Patent
Yasutake et al.

(10) Patent No.: US 6,817,231 B2
(45) Date of Patent: Nov. 16, 2004

(54) SCANNING PROBE MICROSCOPE FOR ULTRA SENSITIVE ELECTRO-MAGNETIC FIELD DETECTION AND PROBE THEREOF

(75) Inventors: Masatoshi Yasutake, Chiba (JP); Hiroyuki Akinaga, Ibaraki (JP); Hiroshi Yokoyama, Ibaraki (JP)

(73) Assignees: Seiko Instruments Inc., Chiba (JP); National Institute of Advanced Industrial Sciency and Technology, Tokyo (JP)

( * ) Notice: Subject to any disclaimer, the term of this patent is extended or adjusted under 35 U.S.C. 154(b) by 0 days.

(21) Appl. No.: 10/331,540

(22) Filed: Dec. 27, 2002

(65) Prior Publication Data

US 2003/0172726 A1 Sep. 18, 2003

(30) Foreign Application Priority Data

Dec. 28, 2001 (JP) ........................................ 2001-401003
Dec. 18, 2002 (JP) ........................................ 2002-366408

(51) Int. Cl.$^7$ ............................. G01B 5/28; G01R 33/00
(52) U.S. Cl. ........................... 73/105; 250/306; 324/261
(58) Field of Search ............................. 73/105; 250/306, 250/307; 324/244, 256, 257, 258, 259, 260, 261

(56) References Cited

U.S. PATENT DOCUMENTS 5,418,363 A * 5/1995 Elings et al. ................. 250/306
6,220,084 B1 * 4/2001 Chen et al. .................... 73/105
6,448,766 B1 * 9/2002 Berger et al. ................. 324/244
6,579,612 B1 * 6/2003 Lille ........................... 428/332

FOREIGN PATENT DOCUMENTS

| DE | 3717566 A1 | * 10/1988 |
| JP | 659004 | * 3/1994 |

OTHER PUBLICATIONS

Sakuta, Shigeru "Proposal and dynamics simulation of scanning tunneling microscope with a giant magnetostrictive alloy" J. Vac. Sci. Technol B vol. 18, No. 5, Sep./Oct. 2000.*

* cited by examiner

*Primary Examiner*—Michael Cygan
(74) *Attorney, Agent, or Firm*—Adams & Wilks

(57) ABSTRACT

The object of the present invention is to provide a method and device thereof that captures microscopic magnetic signals such as those developed by electrical current flowing inside a circuit that is miniaturized to less than sub-micron order, and to evaluate the circuit. The scanning probe microscope for ultra-sensitive electro-magnetic field detection of the present invention has a constitution that uses a giant magnetostrictive material that demonstrates a large magnetostriction characteristic in a weak magnetic field in at least one portion of the probe of a cantilever of a scanning probe microscope, and at the same time as capturing the change in the magnetic flux due to a local change in electrical current, or the magnetic flux of a magnetic body, as a signal of displacement of said giant magnetostrictive material, on the other hand, detects the local shape of a sample surface with the function of the scanning probe microscope, and dissociates and images the magnetic flux information and shape information from the signal of displacement of the giant magnetostrictive material.

20 Claims, 6 Drawing Sheets

SCANNING PROBE MICROSCOPE FOR ULTRA SENSITIVE ELECTRO-MAGNETIC FIELD DETECTION AND PROBE THEREOF

BACKGROUND OF THE INVENTION

1. Field of the Invention

The present invention relates to a technique that evaluates the localized performance of an electronics element that carries out transmission, recording and processing of information, and relates to the industrial field of scanning probe microscopes and micro probe devices for circuit evaluation, etc. and probes etc. thereof.

2. Description of Related Art

In recent years, the expression "information technology (IT) revolution" is heard more and more often. This reflects the current situation in which globalization of the information industry supported by a dramatic technological revolution of electronics etc. is becoming a reality. Electronics for sending, receiving, accumulating and processing important amounts of information when needed exist as fundamental technology of the IT revolution, and intensive research and development is being carried out world-wide with the aim of bringing about further technological innovation. In such a situation, the importance of developing techniques to evaluate the abilities of ultra-integrated electronics elements is increasing day after day. For example, with the objective of testing the operation state of memory cells and calculator elements, as a conventional method, operation testing is being carried out in a state where a voltage is applied to the actual circuit by having wires make contact with several micro probers and then detecting current. Alternatively, in non-contact methods, optical methods and such are proposed, in which a circuit is irradiated with a laser, and the electrical current excited by the laser beam is determined. However, concomitant to the recent miniaturization of circuits, with the all the above-mentioned methods, with a line width inside the element in the order of 0.1 $\mu$m, ensuring that wires make direct contact with the micro probers is difficult, and narrowing the laser beam to the order of 0.1 $\mu$m is extremely difficult.

On another front, for example, Japanese Patent No. 3141555 is proposed as a method that allows detection of electro-magnetic information of microscopic portions in the sub-micron order. This belongs to the so-called scanning probe microscope, and is a magnetic force microscope that detects the electro-magnetic information of a sample surface. Its constitution provides means for mounting a ferromagnetic pointed needle at the tip of a cantilever, means for positioning a magnetic resistant (MR) element at one end of the ferromagnetic pointed needle, means for detecting displacement of the cantilever, means for detecting change in magnetic resistance, means for exciting the cantilever at a specified frequency, means for detecting displacement of the cantilever and the change in magnetic resistance of the specified frequency component, and means for scanning along the sample surface with a probe, and is a scanning magnetic microscope operating on the principle of accurately detecting the position of the sample surface by maintaining the position of the ferromagnetic pointed needle at a constant height above the sample surface from the displacement of the cantilever and determining at the same time the magnetic information from the change in magnetic resistance, and measuring magnetic information by detecting the change in the magnetic resistance above the sample surface at the same location. However, this device has the disadvantages that its sensitivity is insufficient to detect electrical current that flows in the above-mentioned miniaturized wire. In addition, the actual fabrication process of the cantilever such as the accumulation and wiring of MR elements as the detection part becomes cumbersome and complicated. In such a situation, the development of a method is desired which determines the value of the electrical current that actually flows in any portion of the miniaturized integrated circuit, and which furthermore evaluates change in current by breaking the current down spatially and temporally.

SUMMARY OF THE INVENTION

Feature of the present invention is to provide a method and device thereof that captures microscopic magnetic signals such as those developed by electrical current flowing inside a circuit that is miniaturized to sub-micron order or less, to evaluate the circuit and provide a probe employed by this method.

The present invention provides a scanning probe microscope constituted by a giant magnetostrictive material, which demonstrates a large magnetostriction characteristic in a weak magnetic field, adhered to a probe portion of a cantilever of the scanning probe microscope, and at the same time as capturing the change in the magnetic flux due to localized change in electrical current, or the magnetic flux of a magnetic body, as a signal of displacement of the giant magnetostrictive material, and on the other hand, detects the local shape of a sample surface with the function of the scanning probe microscope, and dissociates and images the magnetic flux information and shape information from the signal of displacement of the giant magnetostrictive material. Any of the non-crystalline alloys $Fe_{100-x-y}Si_xB_y$ (here, x is a number at the level of 10 and y at the level of 12), $Tb_{1-x}Dy_xFe_2$ (here, x is a number at the level of 0.73), $Fe_{100-x}Ni$ (here, x is between 60 and 40) may be selected as the giant magnetostrictive material.

Further, as a method for forming a probe of magnetostrictive material for use in a scanning probe microscope of the present invention, the end of a probe of a microscopic columnar structure is taken as a base and particles of magnetostrictive material are deposited with directivity using sputtering or electron-deposition methods.

DETAILED DESCRIPTION OF THE PREFERRED EMBODIMENTS

In the present invention, in order to develop a technique enabling evaluation of circuit functions, and in particular checking of the electrical current inside a circuit of LSIs whose miniaturization is in progress, application of the probe microscope technology was decided upon after considering several options. However, the method does not place the tip of the probe in contact with the sample surface to extract the electrical current directly from a conducting wire of a circuit as with a tunneling microscope, but adopts a method in which the magnetic flux generated by the electrical current is detected by a highly sensitive magnetostrictive material.

Figure 1:
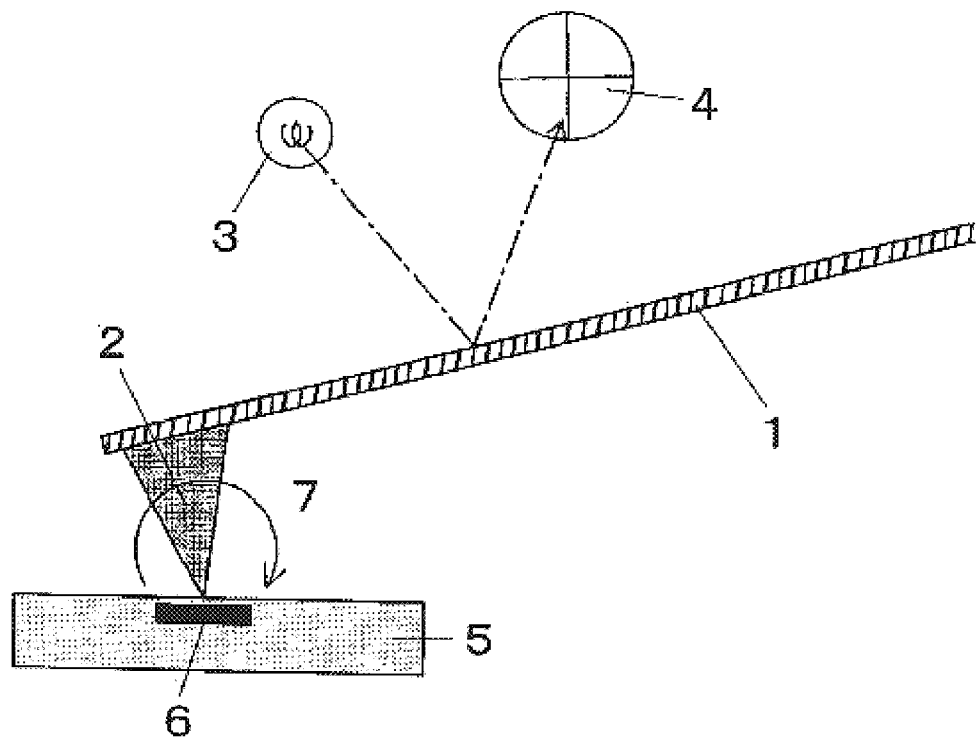
FIG. 1 schematically shows the basic constitution and the detection principles of a probe of the present invention.

The operation principles of the present invention will be described with reference to FIG. 1. Numeral 1 is a cantilever, numeral 2 is a probe affixed to its tip portion, numeral 3 is a light source, and numeral 4 is a photo-electric sensor that detects the position of the beam spot two-dimensionally. The light source 3 and photo-electric sensor 4 operate in co-operation with the back surface of the cantilever 1, which operates as a mirror surface, and function as a displacement detection mechanism for the cantilever 1. The above is the same constitution as that of a general probe microscope. However, the configuration of the present invention is characterized in the point that at least one portion of the probe 2 is constituted from a giant magnetostrictive material. When an electrical current is flowing in a lead wire portion 6 of an LSI 5 that is the sample, a magnetic flux 7 is generated according to the right screw rule. When a magnetostrictive material exists within this generated magnetic field, said magnetostrictive material is subjected to the influence of the change in magnetic field and deforms. As the tip of the probe 2 is maintained in a contact (or adjacent) state with the sample surface by receiving the pressure applied to the cantilever 1, the deformation of the magnetostrictive material can be detected as the amount of displacement of the cantilever 1 by the above-mentioned displacement detection mechanism. However, in addition to the strength of the magnetic field, that is, the magnetic flux density information, the shape information of the sample surface itself over which the tip of the probe is positioned, overlaps with this amount of displacement of the cantilever 1. Therefore, in the present invention, by means of common probe microscope and so on, shape information of the sample surface itself is individually acquired, and its bias portion is compensated, so that only magnetic flux density information is obtained. If this local information is imaged by the scanning microscope, magnetic flux density distribution information of the sample surface can be captured two-dimensionally. The examples shown in the drawings can be used for detecting electrical currents flowing in a lead, that is, for detecting the broken portion of a wire and such, but are not limited to this and are broadly applicable to tests that detect changes in magnetic flux portion by portion such as examination of the magnetic area of a material.

In a case such as detecting the electrical current of a circuit inside a miniaturized LSI, the generated magnetic field is limited to the vicinity of the tip of the probe. In other words, from the fact that the magnetic field to be measured is extremely localized, the entire probe does not operate as a sensor, and therefore only the tip portion of the probe needs to be formed from magnetostrictive material. However, in such a case, in order to obtain a sufficient amount of displacement of the cantilever, it is important to use a highly sensitive magnetostrictive material that deforms considerably in a weak magnetic field, for example, a giant magnetostrictive material. In addition, as a sensor, it is desirable to use a material whose deformability is linear with respect to the strength of the magnetic field. From among the magnetostrictive materials for which, as general characteristics, it is known that with those having a crystal structure, the deformability has a large anisotropy and a poor linearity, and for those that are non-crystalline, the linearity is excellent but the deformability is small. The inventors of the present invention therefore decided, after considering several options, upon the selection of any of the non-crystalline alloys $Fe_{100-x-y}Si_xB_y$ (here, x is a number at the level of 10 and y at the level of 12), $Tb_{1-x}Dy_xFe_2$ (here, x is a number at the level of 0.73), $Fe_{100-x}Ni_x$ (here, x is between 60 and 40) as giant magnetostrictive material of the sensor used in the present invention, from the physical data shown in past research related to giant magnetostrictive materials.

The grounds for specifying $Fe_{78}Si_{10}B_{12}$, is the fact that this was selected based on the research article by the Tohoku University Group, "MAGNETMECHANICAL COUPLING AND VARIABLE DELAY CHARACTERISTICS BY MEAN OF GIANT ΔE EFECT IN IRON-RICH AMORPHOUS RIBBON" J.Appl.Phys.49(3), March 1978, 1718–1720., which shows that an amorphous ribbon of the same material has a magnet mechanical coupling coefficient and that a large field effect was observed, and the appropriateness for using this as a giant magnetostrictive material in the present invention was verified.

The grounds for specifying $Tb_{0.27}Dy_{0.73}Fe_2$, is the fact that this was selected based on the research article by the Tohoku University Group, "Magnetostrictive properties of sputtered binary Tb—Fe and pseudo-binary(Tb—Dy)—Fe alloy films" Journal of Magnetism and Magnetic Materials 171 (1997)320–328, which presents the same alloy as having a low magnetic crystal anisotropic energy, being highly sensitive to external magnetic fields and demonstrating large magnetostrictive characteristics, and the appropriateness for using this as a giant magnetostrictive material in the present invention was verified. In addition, $Tb_{42}Fe_{58}$, and $(Tb_{1-x}-Dy_x)_{42}$—$Fe_{58}$ presented in the same article also provide appropriateness for its use as a giant magnetostrictive material in the present invention. In addition, here, x is in the order of 0.44. Regarding $Tb_{0.27}Dy_{0.73}Fe_2$, it is also presented in the research article by R. Abbundi et al., "ANOMALOUS THERMAL EXPANSION AND MAGNETOSTRICTION OF SIGNAL CRYSTAL $Tb_{0.27}Dy_{0.73}Fe_2$" IEEE Transactions on Magnetics Vol.MAG-13, No.5, September 1977, 1519–1520. In addition, those for which the elemental ratio was expressed in orders, deviation from the order is considered to be ±20%.

The grounds for specifying $Fe_{100-x}Ni_x$ (here, x is between 60 and 40) is the fact that it was selected by focusing on the physical properties as a giant magnetostrictive material presented in the research article by the Research Group of University of Tokyo, "Magnetostriction of Fe—Ni Invar Alloys" JOURNAL OF THE SOCIETY OF JAPAN, Vol.44, No.4, APRIL 1978, 1152–1157, and the physical property that temperature dependency is small, and the appropriateness for using this as a giant magnetostrictive material in the present invention was verified.

In addition to these, as giant magnetostrictive material of the sensor for use in the present invention, as crystalline material, a single crystal of TbFe2 can be used. The grounds for specifying this material is the fact that it was selected by focusing, on the physical properties as a giant magnetostrictive material presented in the above-mentioned research article, "ANOMALOUS THERMAL EXPANSION AND MAGNETOSTRICTION OF SIGNAL CRYSTAL $Tb_{0.27}Dy_{0.73}Fe_2$," IEEE Transactions on Magnetics Vol.MAG-13, No.5, September 1977, 1519–1520, and the physical property that temperature dependency is small, and the appropriateness for using it as a giant magnetostrictive material in the present invention was verified.

A scanning probe microscope having a configuration similar to that of the present invention from the point of adopting magnetorestrictive material at the probe is disclosed in Patent Publication No. WO99-60330. From that disclosed in this specification, this invention relates to the structure of a force-sensitive probe taking the form of a cantilever used in scanning methods for microscopes and atomic force microscopes so as to take note of the fact that it is sometimes preferable for an atomic force microscope to operate in oscillating mode. The cantilever is then made to oscillate at high frequencies, with changes in the amplitude of oscillation (or phase) of the cantilever then being used when the cantilever becomes close to the surface. Magnetic cantilevers are therefore required for this kind of microscope to operate. Therefore, in the preferred embodiment of this invention, the probe is equipped with a cantilever having an upper surface and a lower surface with the bottom surface having a probe tip arranged downwards from the bottom surface. The film comprised by magnetostrictive material may cover either the upper surface or lower surface of the cantilever structure. In one preferred embodiment, the magnetostrictive material covers the upper surface of the cantilever and the cantilever includes a different material covering the bottom surface and the probe tip. The different material may also be magnetostrictive material. As can be understood from this, in this invention, the cantilever is caused to oscillate at high frequency. Therefore, with respect to the use of magnetostrictive material, the present invention is completely different regarding the technological concept of using magnetostrictive material as the sensor converting an amount of magnetism to an amount of displacement for detection. The technology with regards to the use of magnetostrictive material as the probe material may appear similar at first glance but the underlying concepts are fundamentally different.

It is desirable for the sensor for detecting local faint changes in the magnetic field to be unaffected by changes in the environment such as temperature, humidity and oxidation. In addition, the fact that the magnetostriction characteristic is influenced by the crystallinity of the magnetostrictive material is well known to the researchers, and various research is being carried out. However, in the present invention in which giant magnetostrictive materials that are non-crystalline alloys such as $Fe_{100-x-y}Si_xB_y$ (here, x is a number at the level of 10 and y at the level of 12), $Tb_{1-x}Dy_xFe_2$ (here, x is a number at the level of 0.73) and $Fe_{100-x}Ni_x$ (here, x is between 60 and 40) are selected as probe materials for the scanning probe microscope, by carrying out control of the magnitude and anisotropy of magnetization, adjustment of magnetic characteristics such as ferromagnetic transition temperature, or control of crystal growth conditions (control of the crystallization temperature, control of the size of the particles) by adding elements given in the following to the giant magnetostrictive material, a probe material provided with the desired characteristics can be obtained.

First, if copper Cu or niobium Nb is added as an additive when a giant magnetostrictive material of the Fe—Si—B system is used, segregation in the vicinity of the crystal particles is provoked, the size of the particles becomes small, and softening of the magnetic body and increasing the saturation of the magnetic flux density become possible. ("New Fe-based soft magnetic alloys composed of ultrafine grain structure" J.Appl. Phys. 64(10), 15 Nov. 1988, 6044–6046, "Nanocrystalling soft magnetic materials" Journal of Magnetism and Magnetic Materials 112(1992), 258–262) In addition, if vanadium (V) is added to the same material, the size of the particles becomes large when raising the temperature. The fact that when the size of the particles becomes large, the retaining force also becomes large is known. ("Heating rate dependence of magnetic properties for Fe-based nanocrystalline alloys" Journal of Magnetism and Magnetic Materials 171(1997), 300–304) There is the influence that by adding an element from among vanadium (V), molybdenum (Mo), tungsten (W), tantalum (Ta), niobium (Nb), and copper (Cu), the temperature of amorphous-crystal transition changes. In addition, when the percentage of the $Fe_3Si$ phase is increased by the addition of the above, this is accompanied by the phenomenon that the amorphous phase stabilizes, while on the other hand, magnetostriction is also diminished. This balance is therefore important. ("The influence of refractory element additions on the magnetic properties and on the crystallization behaviour of nanocrystalline soft magnetic Fe—B—Si—Cu alloys" Journal of Magnetism and Magnetic Materials 136(1994), 79–87) When the ratio of metalloid elements (Si,B) is changed, there is almost no change in the amorphous phase, but in the case of the crystal phase, magnetostriction becomes larger when less Si is present. ("The Influence of the Si/B Content on the Microstructure and on the Magnetic Properities of Magnetically Soft Nanocrystalline FeBSi—CuNb Alloys" Magnetically Soft Nanocrystalline Fe Bd. 82(1991) H.12, 895–901) If aluminum (Al) is added, anisotropy becomes small, while on the other hand, magnetostriction becomes large. ("Effects of Al on the magnetic properties of nanocrystalline $Fe_{73.5}Cu_1Nb_3Si_{13.5}B_9$ alloys" J.Appl.Phys. 73 (10), 15 May 1993, 6591–6593)

Next is concerning the Tb—Dy—Fe system, and it is know that if niobium (Nb) and zirconium (Zr) are added, the magnetic field sensitivity and the magnitude of the magnetostriction change more or less. ("Magnetostrictive properties of amorphous and nanocrystalline TbDyFe films with Nb and Zr additives" Journal of Magnetism and Magnetic Materials 187 (1998), 17–22). In addition, in regard to adding cobalt Co, research results have been reported, in which the magnetic field sensitivity was improved when the position of Fe was 47% substituted by Co. ("Magnetic and magnetostrictive properties in amorphous $(Tb_{0.27}Dy_{0.73})$ $(Fe_{1-x}Co_x)_2$ films" J.Appl.Phys.87(2), 15 Jan. 2000, 834–839)

Figure 2:
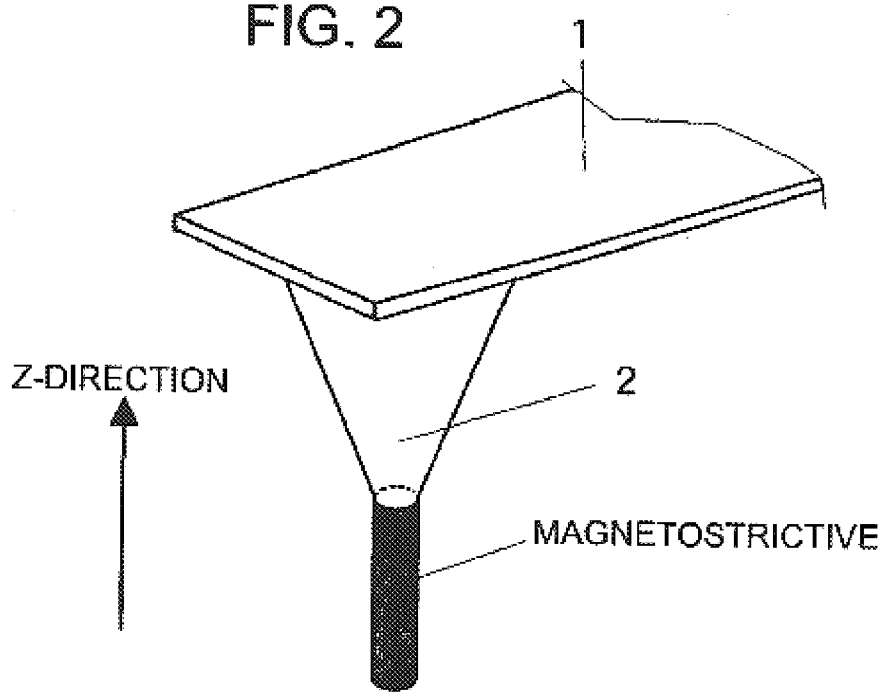
FIG. 2 is a model where magnetostrictive material is formed in a conical shape at the end of a silicon probe.

Next, regarding displacement of a magnetostrictive probe, a probe formed of a columnar (length 1, radius r) magnetostrictive body at the end of a silicon probe as shown in FIG. 2 is considered and calculations of extension are made. When an external magnetic field is taken to be H, the volume distortion ϵv of the magnetostrictive body is expressed by the following equation.

$$\epsilon v = dV/dH \quad (1)$$

Further, taking distortion in the z-axis direction to be ϵz and distortion in the direction of the radius to be ϵr, then the volume distortion ϵv is give by $$\epsilon v = 2\epsilon r + \epsilon z \quad (2)$$

Further, by expressing Poisson's ratio as ν and transforming the above equation, the following equation is arrived at.

$$\epsilon z = \epsilon v/(1-2\nu) \quad (3)$$

A cantilever of an Atomic Force Microscope (AFM) detects displacement in the direction of the z-axis. Change in the length is the z-direction λ is then:

$$\lambda = \int_0^l \varepsilon_z dl \quad (4)$$

The shape of the columnar magnetostrictive probe given by equation (3) and equation (4) is then taken to be a value such that the length 1 in the z-axis direction is large compared to the radius. A large z-displacement signal can then be obtained by adopting a magnetostrictive body with large volume-distortion and Poisson ratio.

Figure 3A:
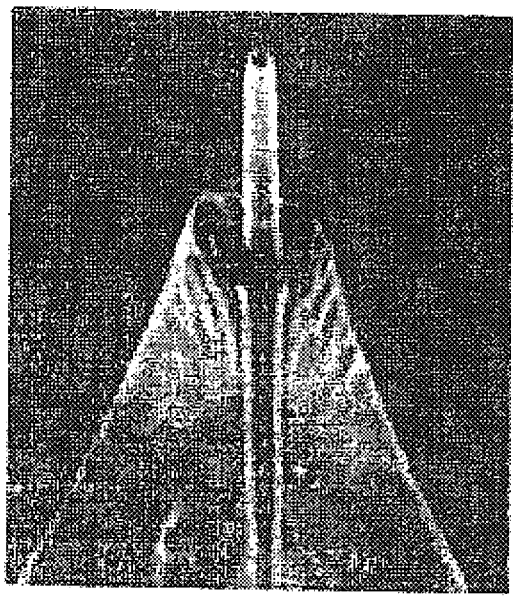
FIG. 3 is a view showing an example of a short probe end taken as a base for depositing particles of magnetostrictive particles.
Figure 3B:
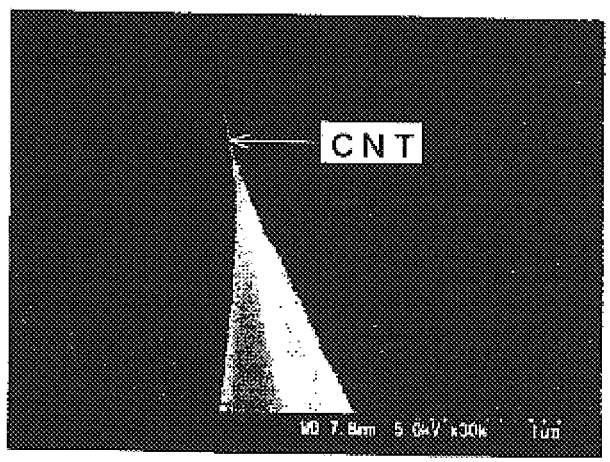
Figure 3B:
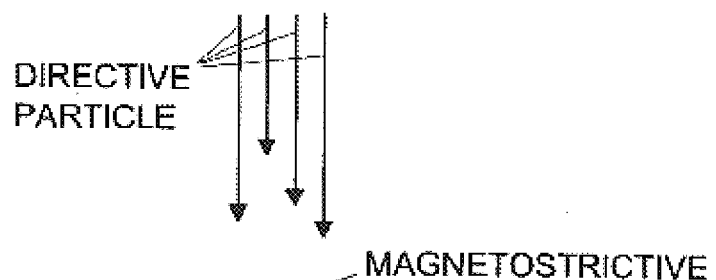
Figure 4:
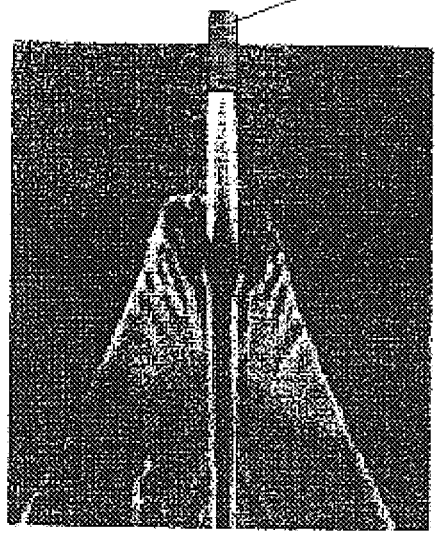
FIG. 4 is a view illustrating a method for depositing particles of magnetostrictive particles at the end of a columnar deposition structure.

A method for forming a columnar magnetostrictive probe is now described. The length in the z-axis direction is formed to be long so that the magnetostrictive material can be deposited using methods employing techniques such as sputtering or electron beam deposition. During this time, it is beneficial for the probe constituting the base to have a high aspect ratio, as shown in FIG. 3. FIG. 3A is a tip section formed by deposition as a result of irradiating a gallium ion beam onto the end of a silicon probe within the chamber of a focussed ion beam device while injecting organo-metallic or organo-carbon gas, and FIG. 3B shows a carbon nanotube fitted to the silicon probe part. By taking the probe end as a base, magnetostrictive particles can be deposited with directivity using a method such as sputtering or electron beam deposition as shown in FIG. 4. As a method of improving directivity, a method is provided where a shadow mask is inserted between the target and the deposited probe and the directivity of the flux of the deposited magnetostrictive material is increased. When electron beam deposition is used, it is also possible to increase directivity of the flux in the same manner.

Figure 5:
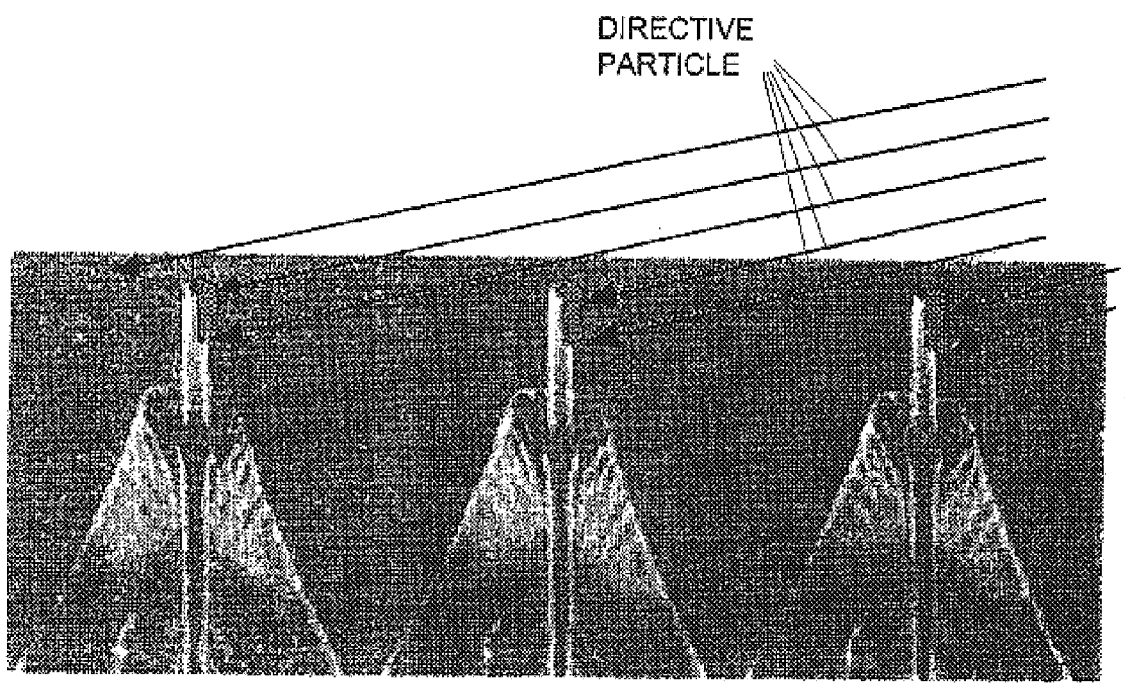
FIG. 5 is a view illustrating a method for depositing magnetostrictive particles at the ends of probes by deposition at an angle.

When the directivity of the flux of the magnetostrictive material is high, as shown in FIG. 5, a plurality of probes are arranged in an array. Magnetostrictive particles are then affixed in a direction at an angle to the end part so as to form probes using an inclined deposition technique. It is also possible with this method for the probes arranged to the front to constitute a shadow and for magnetostrictive material to be deposited only at the end portions of the probes.

First Embodiment

Figure 6:
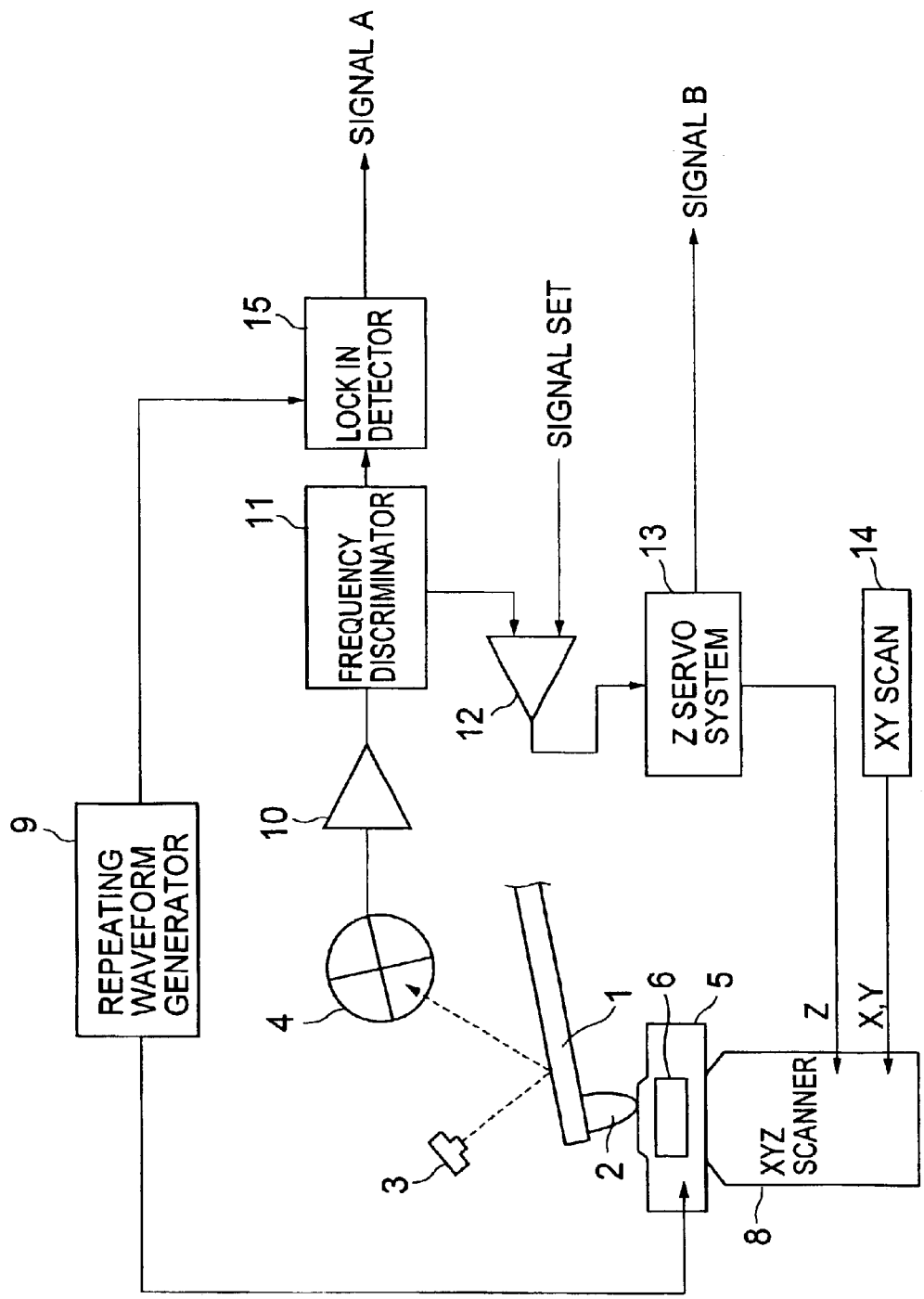
FIG. 6 is a drawing of the constitution of a system according to one example of the present invention.

An embodiment of a device for a scanning probe microscope that uses a giant magnetostrictive material in at least one portion of a probe will be described with reference to FIG. 6. Numeral 1 is a cantilever, and a probe 2 that uses a giant magnetostrictive material in at least one portion is provided at its tip. A light source 3 employing a laser diode and a two-dimensional photo-electric sensor 4 that uses a PSD (Position Sensitive Detector) are arranged at the back surface portion of the cantilever 1. A sample 5 such as an LSI is mounted on an X, Y, Z scanner 8 that is driven three-dimensionally by a piezo element, and the present device example detects an alternating current flowing in a lead 6 and such, inside the circuit of said sample 5. Numeral 9 is a repeating waveform generator circuit, the repeating waveform signal generated in the circuit 9 is applied to the circuit of sample 5, and said alternating current signal flows in lead 6. By the fact that an alternating current signal flows in lead 6, an alternating magnetic field that follows the repeating waveform signal is formed in the surroundings. Since a giant magnetostrictive material is used at least in one portion of the probe 2, the giant magnetostrictive material present within said alternating magnetic field deforms due to its influence. Since the cantilever 1 is in a pressed state at a prescribed pressure, and is causing the tip of the probe 2 to make contact with the surface of the sample 5, the deformation of the giant magnetostrictive material becomes a displacement of the cantilever 1, and this displacement is detected by a light lever displacement detection mechanism (light source 3 and PSD 4) which has as mirror surface the back surface of the cantilever 1. However, the surface shape information of the sample 5 is included in this amount of displacement, in addition to the displacement based on the alternating magnetic field that follows the repeating waveform signal, which is focused on now.

The displacement signal detected by the PSD 4 is amplified through a preamp 10, put into a frequency discriminator 11, and is discriminated by a signal with a high frequency corresponding to the frequency generated at the repeating waveform generator 9 and a signal with a low frequency corresponding to the surface shape information and such of the sample 5. The signal with a low frequency is inputted into the input terminal on one side of a comparator 12, and a difference with a signal Set inputted into the input terminal on the other side is calculated. This signal Set is the initial signal Set for the cantilever 1, and the displacement component that is vertical (in the Z direction) with respect to the sample mounted surface of the scanner 8, of the cantilever 1 displacement, is obtained as the output of this comparator 12. The signal is inputted into a Z servo system 13, and a piezo element drive signal that only cancels the detected said vertical displacement component is generated to carry out Z drive of the scanner 8. By the fact that the Z drive of said scanner 8 is accomplished, the position of the surface of the sample 5 is shifted only by that amount, and the position of the cantilever 1 through the probe 2 is maintained at the identical position with respect to the light source 3 and the PSD 4 that constitute the displacement detection mechanism. In other words, the loop consisting of the probe 2, the cantilever 1, the PSD 4, the preamp 10, the frequency discriminator 11, the comparator 12, the Z servo system 13, the scanner 8, and the sample 5, constitute a servo system with a so-called zero-level balance method 15, and maintains the position of the tip of the probe 2 and the position of the cantilever 1 at a prescribed position, to maintain the contact state with the sample.

Meanwhile, the vertical displacement component of the cantilever 1 is outputted from the Z servo system 13, with this being a surface position signal B of the sample 5. In this amount of displacement, the amount of change of the size of the sample 5 due to temperature is included, but generally, displacement and change based on the temperature change within the time of measurement is not a problem.

The above was the operation of the present device regarding the low frequency component of the output signal of PSD 4, but a signal component with a high frequency corresponding to the frequency generated in the repeating waveform generator 9 is included in this output signal of PSD 4. This signal is the amount of displacement of cantilever 1 caused by the deformation of the giant magnetostrictive material based on the alternating magnetic field generated in its surroundings due to the fact that a repeating waveform signal flows in the lead 6. This high frequency signal is extracted by the frequency discriminator 11, and sent to a lock-in detector 15. The repeating waveform signal has already been sent from the previous repeating waveform generator circuit 9 to this lock-in detector 11, the phase is synchronized and the amount of displacement corresponding to the deformation of the giant magnetostrictive material based on the alternating magnetic field that follows the repeating waveform signal is detected by lock-in detection. This is the detection signal A, which checks whether a repeating waveform signal is flowing normally in lead 6. Numeral 14 is a XY scan electrical source, and applies the generated voltage to the piezo element of the scanner 8 to make it an XY drive signal. With this, the surface of the sample 5 is displaced in the XY direction to obtain the two-dimensional information of the detection signal. This is the drive mechanism as a so-called scanning microscope. The method of this example is characterized in the point that it is provided with a function that can discriminate the shape information of the sample in the displacement signal detected by applying a high frequency signal to a sample such as an LSI.

Second Embodiment

Figure 7:
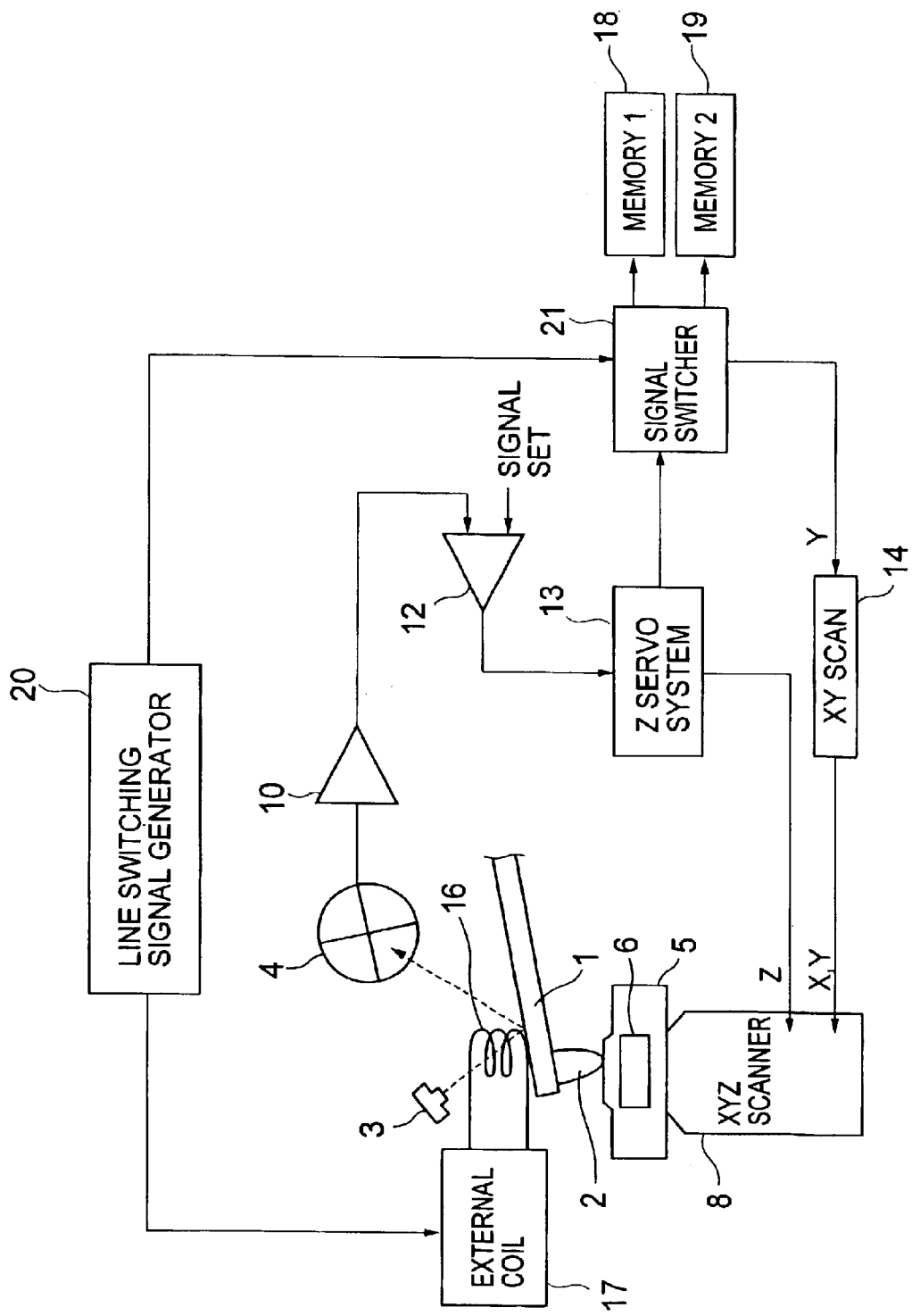
FIG. 7 is a drawing of the constitution of a system according to another example of the present invention.

Next, an embodiment of a device for a method used in a static situation such as for examining leaked magnetic field from LSI and magnetic domain of magnetic elements where high frequency signals cannot be used as the input, is shown in FIG. 7, and will be described. This is the same as the previous example on the point that it is provided with a cantilever 1, a probe 2, a light source 3, a PSD 4, a preamp 10, a comparator 12, a Z servo system, and an XY scan electrical source 14. In this embodiment, an electrical source for repeating waveform generation is not used. Instead, there is provided a line switching signal generator 20, an external coil 16 that saturates the deformation of the giant magnetostrictive material as the sensor and its electrical source 17, a signal switcher 21 and numerals 18 and 19 for memory 1 and memory 2.

Since the object to be examined in the present example is in a static electromagnetic field state, it is not possible to dissociate based on the frequency the amount of displacement based on the shape of sample 5 from the signal detected as the amount of displacement of the cantilever 1, as in the previous example. Therefore, in this example, an external coil 16 that forms a magnetic field that can only saturate the deformation of the giant magnetostrictive material of the probe portion is placed, and is intermittently controlled to be ON and OFF by an external coil electrical source 17. Since in a state where the magnetic field is generated, the deformation of the giant magnetostrictive material, which is the sensor, is already in a saturated state, this is independent from the magnetic flux generated by the sample 5. That is, the displacement of the cantilever 1 measured in this state is dependent only on the information on the displacement of the surface of the sample 5. On the other hand, in a state where an electrical current is not flowing in the external coil 16, there is no magnetic field developed by the coil 16, and in the displacement of cantilever 1, the deformation of the giant magnetostrictive material based on the magnetic flux generated by the sample 5 and the information on the displacement of the surface of the sample 5 overlap, as in the case of the previous example. Therefore, the former information is the signal B corresponding to the sample shape information, and signal A, which is the local electromagnetic field information in the surface of the sample 5, can be obtained by subtracting the former information from the latter information. A simple method may be considered in which a cantilever for obtaining signal A and a cantilever for obtaining signal B are provided individually, but with a sample such as an ultra LSI, which is the object of the present invention, having an extremely narrow observation image area, it is extremely difficult to match the position of the detection values from different probes. Therefore, in the present example, by using the same probe and repeating the same line scan, the accuracy of the positional correlation between the two detection values is maintained.

The line switching signal generator 20 generates a timing signal, which causes a one line (in the X direction) scan be executed twice. A line step (in the Y direction) is then executed during the two-dimensional scan by the scanner 8. When the external coil electrical source 17 receives a timing signal from this line switching signal generator 20, an OFF state is entered at the initial scan time of the one line scan, and an ON state is entered at the re-scan time. In addition, this operation state needs only to be switched between being ON or OFF between the first scan and the re-scan, and this operation may also be carried out in reverse. The displacement of the cantilever 1 is detected by the PSD 4, and the detection signal is sent through the preamp 10 to the comparator 12. The signal is inputted into the input terminal on one side of the comparator 12, and the difference with the signal Set inputted into the input terminal on the other side is calculated. This signal Set is the initial signal Set for the cantilever 1, and the displacement component that is vertical (in the Z direction) with respect to the sample mounted surface of the scanner 8, of the cantilever 1 displacement, is obtained as the output of this comparator 12. The signal is inputted to the Z servo system 13, and a Piezo element drive signal that only cancels the detected vertical displacement component is generated to carry out Z drive of the scanner 8. By the fact that the Z drive of said scanner 8 is accomplished, the position of the surface of the sample 5 is shifted only by that amount, and the position of the cantilever 1 through the probe 2 is maintained at the identical position with respect to the light source 3 and the PSD 4 that constitute the displacement detection mechanism. These points are identical to those of the previous example. However, in this example, the servo system of the zero level balance method consists of the loop including the probe 2, the cantilever 1, the PSD 4, the preamp 10, the comparator 12, the Z servo system 13, the scanner 8, and the sample 5.

The timing signal from the line switching signal generator 20 is also sent to a signal switcher 21, which carries out a switching operation so that the Z direction displacement signal outputted from the Z servo system 13 is written into the memory 1 18 at the initial line scan time, and written into the memory 2 19 at the re-scan time. In this example, since at the re-scan time, the external coil 16 is ON, in other words, the sensor is in the saturated state, signal A, which is the local electro-magnetic field information in the surface of the sample 50, and signal B, which corresponds to the sample shape information, are stored in memory, in memory 1 and in memory 2 respectively. A timing signal is delivered from the signal switcher 21 with the timing of completion of the re-line scan, sent to the XY scan electrical source, and the line step (in the Y direction) is carried out.

Third Embodiment

Figure 8:
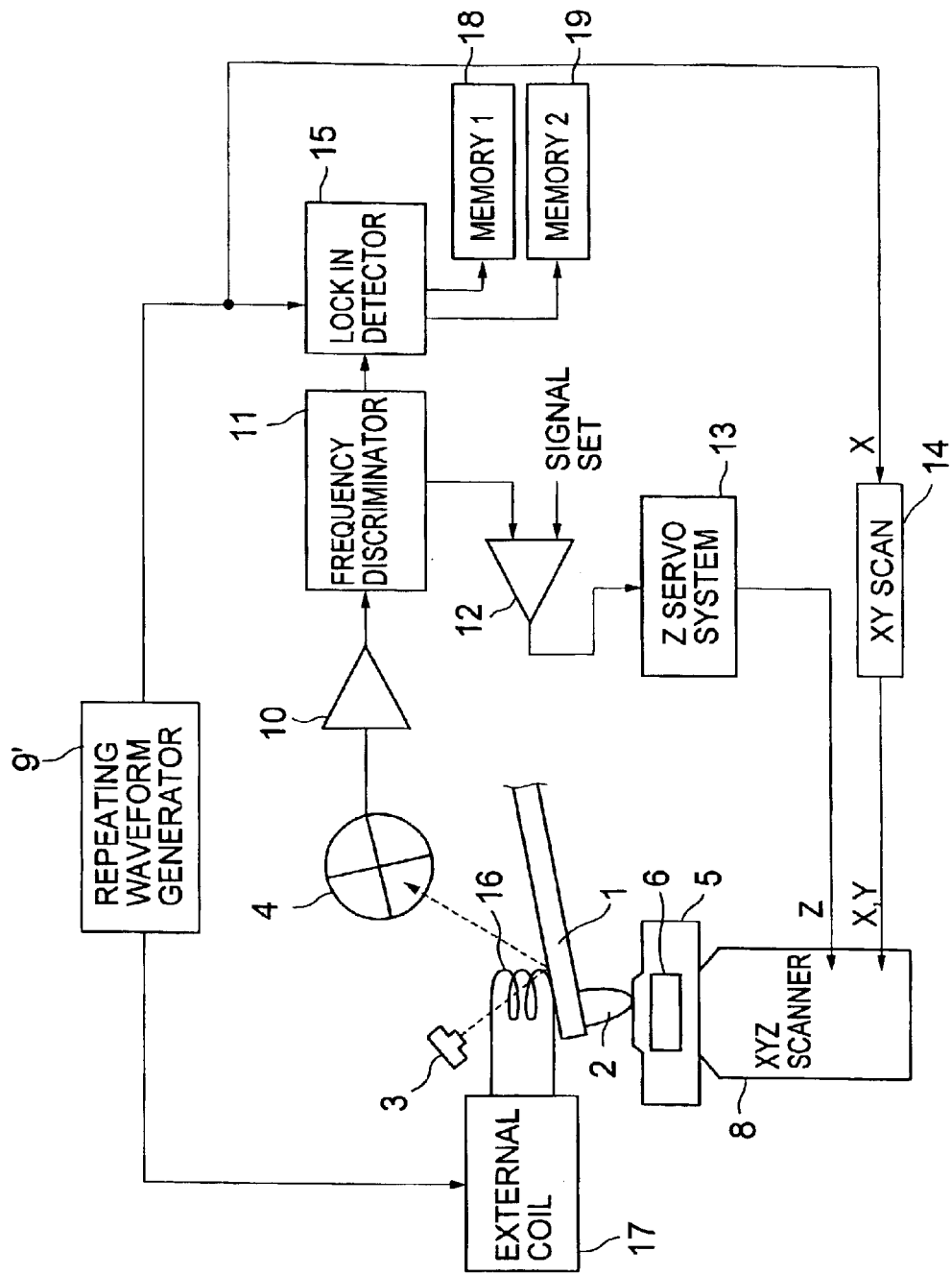
FIG. 8 is a drawing of the constitution of a system according to a further different example of the present invention.

Another device example for the method used in a static situation such as for examining leaked magnetic field from LSI and magnetic domain of magnetic elements where high frequency signals cannot be used as the input is shown in FIG. 8 and will be described. Similarly to Example 2, also in the present example, an external coil 16 is provided, which forms a magnetic field that only saturates the deformation of the giant magnetostrictive material of the probe portion, and is controlled to be ON or OFF intermittently by an external coil electrical source 17, but in contrast to Example 2, which carries out intermittent ON/OFF control on the timing of the one line scan, in the present example, switching is controlled for each item of localized information, in other words, for each pixel. As a result of the fact that this is a method that detects the two signals in a state where the probe is in the same position, i.e. the detection signal which is only the shape signal, and the amount of displacement generated from the magnetic flux of the sample overlaps with the signal, the accuracy of positional correspondence between the two signals becomes higher.

The ON/OFF control of the external coil 16 by the external coil electrical source 17 is performed by sine wave or block pulses generated from a repeating signal generator 9'. Since this repeating signal corresponds to the pixel scan (in the X direction), it has a low frequency, and does not have a high frequency as in Example 1. The external coil electrical source 17, which receives a negative signal, enters the OFF state at the time of the initial scan of the one line scan, enters the ON state upon receiving a positive signal. In addition, this operation state needs only to be switched to ON/OFF and may be inverted. The displacement of cantilever 1 is detected by the PSD 4, and, as in the first embodiment, the detection signal is sent through the preamp 10 to the frequency discriminator 11, the direct current portion is sent to the comparator 12, and the alternating current portion is sent to the lock-in detector 15. The direct current signal is inputted into the input terminal on one side of the comparator 12, and the difference with the signal Set inputted into the input terminal on the other side is calculated. This signal Set is the initial signal Set for the cantilever 1, and the displacement component that is vertical (in the Z direction) with respect to the sample mounted surface of the scanner 8, of the cantilever 1 displacement, is obtained as the output of this comparator 12. The signal is inputted into a Z servo system 13, and a piezo element drive signal that only cancels the detected vertical displacement component is generated to carry out Z drive of the scanner 8. By the fact that the Z drive of said scanner 8 is accomplished, the position of the surface of the sample 5 is shifted only by that amount, and the position of the cantilever 1 through the probe 2 is maintained at an identical position with respect to the light source 3 and the PSD 4 that constitute the displacement detection mechanism. These points are identical to those of the previous example. In this example, the servo system of the zero level balance method consists of the loop including the probe 2, the cantilever 1, the PSD 4, the preamp 10, the frequency discriminator 11, the comparator 12, the Z servo system 13, the scanner 8, and the sample 5.

The alternating current portion discriminated in the frequency discriminator 11 is sent to a lock-in detector 15, but in this lock-in detector 15, a sine wave or block pulses from the repeating signal generator 9' has been is inputted, and depending on whether that signal is positive or negative, switching to memories of numerals 18 and 19 is performed to store the detection signal from the frequency discriminator 11. In other words, when that signal is negative, an electrical current is not flowing in the external coil 16. Therefore, since the signal in which the information on the deformation of the giant magnetostrictive material due to the local magnetic flux generated from the sample 5 and the information of the position of the surface of the sample 5 overlap is detected during this period, this signal is written as signal A into the memory 1 of numeral 18. In addition, when that signal is positive, an electrical current is flowing in the external coil 16 external. The deformation of the giant magnetostrictive material is therefore saturated, and since only the signal of the position of the surface of the sample 5 is detected during this period, this is written as signal B into the memory 2 of numeral 19.

In addition, in the above-mentioned Examples 2 and 3, an external coil was used as the external magnetic field generation means, but the present invention is by no means limited in this respect, and any suitable magnetic field generation means may be used providing that saturation of the deformation of the giant magnetostrictive material taken as the sensor is achieved.

Because the scanning probe microscope for ultra-sensitive electromagnetic field detection of the present invention is using a giant magnetostrictive material that demonstrates a large magnetostriction characteristic in a weak magnetic field in at least one portion of the probe of a probe microscope, it can determine the value of the electrical current that actually flows in any portion of a miniaturized integrated circuit. Furthermore, the present invention can evaluate the change by breaking it down spatially and temporally, and is therefore ground breaking. Furthermore, even for those samples for which a coating process etc. has been performed on the surface of the sample, so that the circuit portion is not directly exposed, because electrical current is not extracted through direct contact with a probe, examination is possible in principle. In addition, problems such as lack of sensitivity as a sensor such as with sensors using a magnetic resistance element and complication in the fabrication process of the cantilever such as the accumulation and wiring of MR elements as the detection part, were resolved.

In the scanning probe microscope for ultra-sensitive electro-magnetic field detection of the present invention, by selecting any of the non-crystalline alloys $Fe_{100-x-y}Si_xB_y$ (here, x is a number at the level of 10 and y at the level of 12), $Tb_{1-x}Dy_xFe_2$ (here, x is a number at the level of 0.73) and $Fe_{100-x}Ni$ (here, x is between 60 and 40) as the giant magnetostrictive material to be used, a probe sensor with a highly sensitive and linearly magnetostrictive characteristics was obtained. In addition, from among the elements including Nb, Cu, V, Mo, W, Ta, Al, Zr and Co, by adding at least one type to the giant magnetostrictive material, to carry out control of the magnitude and anisotropy of magnetization, adjustment of magnetic characteristics such as ferromagnetic transition temperature, or control of crystal growth conditions (control of the crystallization temperature, control of the size of the particles), a probe material provided with the desired characteristics could be obtained.

The scanning probe microscope for ultra-sensitive electro-magnetic field detection of the present invention is provided with means for passing an electrical current repeatedly in a wire or a circuit that is to be the sample, means for detecting displacement of the giant magnetostriction body, which expands and shrinks due to the magnetic flux generated by the electrical current, as a signal of displacement of the cantilever, and means for detecting the detection signal in a manner synchronized with the periodicity of the repeated electrical current, the shape signal and the signal in which the information on the displacement of the giant magnetostriction body due to the static magnetic field of a magnetic sample or a sample in which an electrical current is flowing constantly and the shape information overlap can be detected simultaneously and parallel with the same probe, not only is the examination procedure simple, but there is no need to carry out positional matching of the two signals.

In addition, the scanning probe microscope for ultra-sensitive electro-magnetic field detection of the present invention is provided with external magnetic field generation means that can saturate the displacement of the giant magnetostrictive material used as the probe, means for turning the external magnetic field generation means ON or OFF every one line scan or one pixel, switching means for time-dividing the detection signal every one line scan or one pixel, and means for carrying out a difference calculation of the time-divided signal are provided, can detect in a time-divided manner with the same probe, the shape signal and the signal in which the information on the displacement of the giant magnetostriction body due to the static magnetic field of a magnetic sample or a sample in which an electrical current is flowing constantly and the shape information overlap, and examination is possible with the scan position of at least one side in a maintained state, allowing for a high accuracy in the positional matching of the above two signals.

In the method for forming a probe of magnetostrictive material for use in a scanning probe microscope of the present invention, the end of a probe of a microscopic columnar structure is taken as a base and magnetostrictive particles are then deposited with directivity using sputtering or electron deposition so as to form columnar probes of magnetostrictive material and enable the extraction of substantial displacement in the direction of the z-axis.

In the method for forming a probe of magnetostrictive material for use in a scanning probe microscope of the present invention adopting a structure where a shadow mask is inserted between the target and the deposited probe, it is possible to increase directivity of the flux of the deposited magnetostrictive material using this structure.

What is claimed is:

1. A scanning probe microscope for ultra-sensitive electro-magnetic field detection, comprising: scanning means for scanning the vicinity of a surface of a sample with a cantilever having a microscopic probe; and means for obtaining shape information and physical information of the sample surface based on flexure of the cantilever while the cantilever is being scanned across the surface of the sample; wherein the microscopic probe has a base portion on the cantilever and a tip portion extending from the base portion, and a distal end of the tip portion is formed of a giant magnetostrictive material which is a magnetostrictive material having a large magnetostriction characteristic in a weak magnetic field for detecting an electromagnetic field in a local portion of the sample surface by undergoing deformation when exposed to a magnetic field.

2. A scanning probe microscope according to claim 1; wherein the giant magnetostrictive material comprises one or more of the non-crystalline alloys $Fe_{100-x-y}Si_xB_y$ (wherein x is 10 and y is 12), $Tb_{1-x}Dy_xFe_2$ (wherein x is 0.73), and $Fe_{100-x}Ni$ (wherein x is between 40 and 60).

3. A scanning probe microscope according to claim 1; wherein the giant magnetostrictive material is the crystalline material $TbFe_2$.

4. A scanning probe microscope according to claim 2; further comprising one or more of the elements Nb, Cu, V, Mo, W, Ta, Al, Zr and Co added to the giant magnetostrictive material for adjustment of magnetic characteristics and control of crystal growth conditions of the giant magnetostrictive material.

5. A scanning probe microscope according to claim 3; further comprising one or more of the elements Nb, Cu, V, Mo, W, Ta, Al, Zr and Co added to the giant magnetostrictive material for adjustment of magnetic characteristics and control of crystal growth conditions of the giant magnetostrictive material.

6. A scanning probe microscope according to claim 1; further comprising means for passing an electrical current repeatedly through a wire or a circuit portion of the sample so that a magnetic flux is generated in response to the current; means for detecting displacement of the probe having the giant magnetostrictive material, which expands and contracts in response to the magnetic flux generated by the electrical current, as a displacement signal of the cantilever; and means for extracting a detection signal from the displacement signal in a manner synchronized with the periodicity of the repeated electrical current.

7. A scanning probe microscope according to claim 1; further comprising external magnetic field generating means for generating a magnetic field capable of inducing saturating displacement of the giant magnetostrictive material in the probe; means for controlling the external magnetic field generating means so that the magnetic field is turned ON and OFF for each line or pixel of the sample scanned by the scanning means such that scanning of each line or pixel is performed once with the magnetic field turned ON and once with the magnetic field turned OFF; switching means for time-dividing the detection signal for each scanned line or pixel; and difference calculating means for calculating a difference of the time-divided signal and extracting a signal due to the static magnetic field of the sample by subtracting a shape signal that is detected based on displacement of the giant magnetostriction material while the giant magnetostriction material is saturated as a result of applying an external magnetic field from a signal that is detected based on displacement of the giant magnetostriction material due to the static magnetic field of the sample, which is detected while the external magnetic field is OFF, and which overlaps the shape signal.

8. A method for forming a probe of magnetostrictive material for use in a scanning probe microscope, comprising the steps of: providing a probe having a cantilever portion, and a microscopic columnar structure extending from the cantilever portion; and depositing magnetostrictive particles from a target formed of a magnetostrictive material onto a distal end of the microscopic columnar structure by sputtering or electron-deposition to form a tip portion of the probe that undergoes deformation when exposed to a magnetic field to cause deflection of the cantilever portion.

9. A method for forming a probe of magnetostrictive material for use in a scanning probe microscope according to claim 8; wherein the step of depositing the particles of magnetostrictive material is performed with directivity.

10. A method for forming a probe of magnetostrictive material for use in a scanning probe microscope according to claim 9; further comprising the step of inserting a shadow mask between the target and the probe while performing the step of depositing the particles of magnetostrictive material.

11. An apparatus for ultra-sensitive electro-magnetic field detection, comprising: a probe having a cantilever portion and a tip portion extending from the cantilever portion, a distal end of the tip portion being formed of a magnetostrictive material having a large magnetostriction characteristic in a weak magnetic field for detecting an electromagnetic field of a sample by undergoing deformation when exposed to a magnetic field to cause deflection of the cantilever portion; scanning means for scanning the cantilever probe relative to the sample; detecting means for detecting flexure of the cantilever probe as the cantilever probe is being scanned relative to the sample and outputting a detection signal; and means for obtaining electromagnetic field information of the sample by extracting from the detection signal a signal based on displacement of the probe that is not caused by the electromagnetic field of the sample.

12. An apparatus according to claim 11; wherein the magnetostrictive material comprises one or more of the non-crystalline alloys $Fe_{100-x-y}Si_xB_y$ (wherein x is 10 and y is 12), $Tb_{1-x}Dy_xFe_2$ (wherein x is 0.73), and $Fe_{100-x}Ni$ (wherein x is between 40 and 60).

13. An apparatus according to claim 12; further comprising one or more of the elements Nb, Cu, V, Mo, W, Ta, Al, Zr and Co added to the magnetostrictive material for adjustment of magnetic characteristics and control of crystal growth conditions of the magnetostrictive material.

14. An apparatus according to claim 11; wherein the magnetostrictive material is the crystalline material $TbFe_2$.

15. An apparatus according to claim 14; further comprising one or more of the elements Nb, Cu, V, Mo, W, Ta, Al, Zr and Co added to the magnetostrictive material for adjustment of magnetic characteristics and control of crystal growth conditions of the magnetostrictive material.

16. An apparatus according to claim 11; wherein the magnetostrictive material is $Tb_{42}Fe_{58}(Tb_{1-x}$—$Dy_x)_{42}$—$Fe_{58}$, wherein x is 0.44.

17. An apparatus according to claim 11; wherein the magnetostrictive material is $Tb_{0.27}Dy_{0.73}Fe_2$.

18. An apparatus according to claim 11; further comprising means for passing a periodic electrical current through a wire or a circuit portion of the sample so that a magnetic flux is generated in response to the current; means for detecting displacement of the cantilever probe while the magnetostrictive material expands and contracts in response to the magnetic flux and producing a corresponding displacement signal; and means for extracting a detection signal from the displacement signal in synchronism with the periodic electrical current.

19. An apparatus according to claim 11; wherein the probe is formed by depositing magnetostrictive particles onto an end of a probe having a microscopic columnar structure by sputtering or electron-deposition.

20. An apparatus according to claim 19; further comprising the step of inserting a shadow mask between the target and the probe while depositing the magnetostrictive particles.

* * * * *